US012600281B2

(12) United States Patent
Bart et al.

(10) Patent No.: US 12,600,281 B2
(45) Date of Patent: Apr. 14, 2026

(54) HEAD SUPPORT COMPRISING A NOISE-SUPPRESSION DEVICE, AND VEHICLE SEAT

(71) Applicant: AUDI AG, Ingolstadt (DE)

(72) Inventors: Alexander Bart, Ingolstadt (DE); Edwin Ollefers, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 187 days.

(21) Appl. No.: 18/577,533

(22) PCT Filed: Jun. 29, 2022

(86) PCT No.: PCT/EP2022/067991
§ 371 (c)(1),
(2) Date: Jan. 8, 2024

(87) PCT Pub. No.: WO2023/280664
PCT Pub. Date: Jan. 12, 2023

(65) Prior Publication Data
US 2024/0343177 A1     Oct. 17, 2024

(30) Foreign Application Priority Data

Jul. 9, 2021    (DE) .......................... 102021117764.2

(51) Int. Cl.
| | |
|---|---|
| *B60N 2/879* | (2018.01) |
| *B60N 2/885* | (2018.01) |
| *B60Q 3/233* | (2017.01) |
| *F21V 33/00* | (2006.01) |
| *G10K 11/178* | (2006.01) |
| *H04R 1/02* | (2006.01) |
| *F21W 106/00* | (2018.01) |

(52) U.S. Cl.
CPC ............. *B60N 2/879* (2018.02); *B60N 2/885* (2018.02); *B60Q 3/233* (2017.02); *F21V 33/0056* (2013.01); *G10K 11/17885* (2018.01); *H04R 1/025* (2013.01); *H04R 1/028* (2013.01); *F21W 2106/00* (2018.01); *G10K 11/17827* (2018.01); *G10K 2210/128* (2013.01); *H04R 2499/13* (2013.01)

(58) Field of Classification Search
CPC .............. B60N 2/879; G09F 2023/005; F21V 33/0056; G10K 11/17885; B60Q 3/233
See application file for complete search history.

(56) References Cited

U.S. PATENT DOCUMENTS

| | | | | |
|---|---|---|---|---|
| 4,217,628 A | * | 8/1980 | Windom | ................. G09F 13/04 439/13 |
| 2015/0329025 A1 | | 11/2015 | Szczygiel et al. | |
| 2018/0226004 A1 | * | 8/2018 | Lin | ........................ A47C 7/725 |
| 2021/0166675 A1 | * | 6/2021 | Soltner | ............ G10K 11/17817 |

FOREIGN PATENT DOCUMENTS

| | | |
|---|---|---|
| EP | 3227144 B1 | 7/2019 |
| EP | 3828880 A1 | 6/2021 |

OTHER PUBLICATIONS

International Preliminary Report on Patentability issued on Jan. 18, 2024, in corresponding International Application No. PCT/EP2022/067991, 8 pages.

* cited by examiner

*Primary Examiner* — Syed A Islam
(74) *Attorney, Agent, or Firm* — Maier & Maier, PLLC

(57) ABSTRACT

A headrest which is designed to at least partially surround a head. The headrest has a device for noise suppression, which is arranged on a side of the headrest (facing toward a head position.

14 Claims, 2 Drawing Sheets

Fig. 1
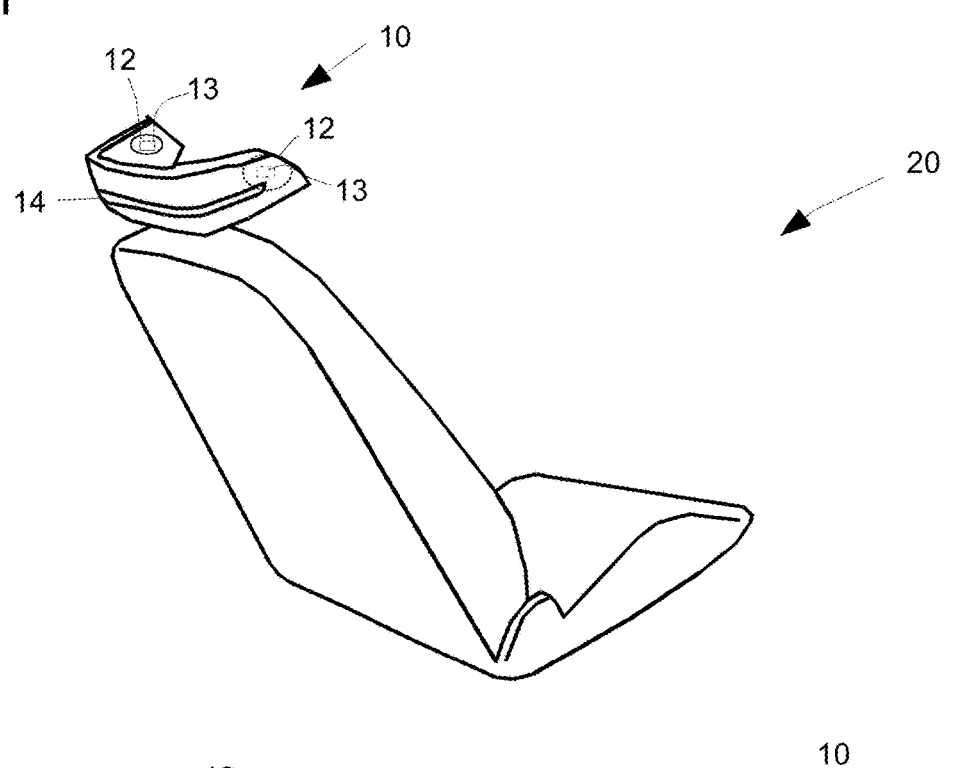
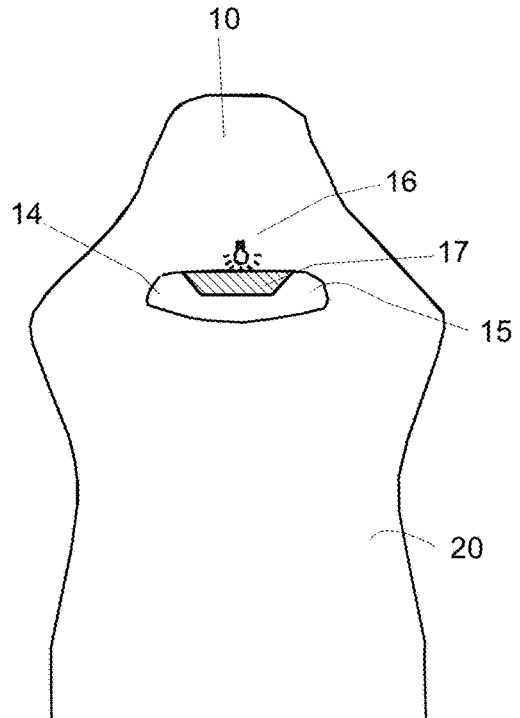
Fig. 2A
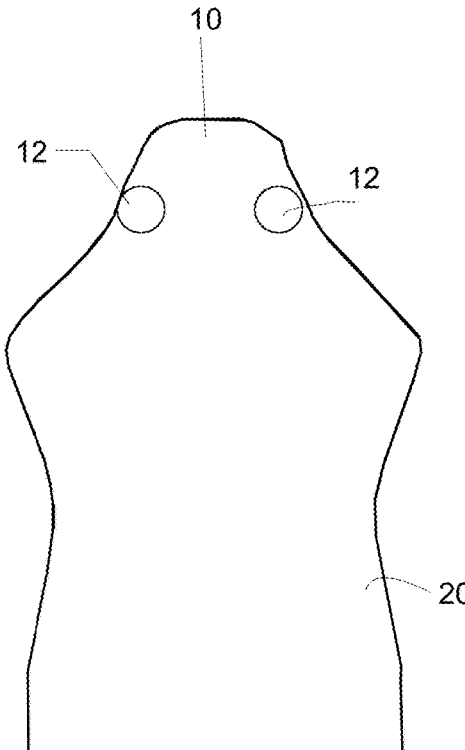
Fig. 2B

HEAD SUPPORT COMPRISING A NOISE-SUPPRESSION DEVICE, AND VEHICLE SEAT

FIELD

The invention relates to a headrest having a device for noise suppression. The invention furthermore relates to a vehicle seat.

BACKGROUND

With the development of vehicles for autonomous driving, novel usage concepts for vehicles are increasingly becoming the focus of further developments. For example, concepts are being discussed that will enable vehicle occupants to relax or work during the journey.

WO 2014/026165 A2 discloses a system and a method for controlled audio in a vehicle cabin. EP 3 528 241 B1 discloses a noise reduction device, a noise reduction system comprising the noise reduction device, and a noise reduction control method.

SUMMARY

The object underlying the invention is to provide an improved headrest and an improved vehicle seat.

According to embodiments, a headrest that is designed to at least partially surround a head has a device for noise suppression that is arranged on a side of the headrest facing toward a head position. Further embodiments relate to a vehicle seat having such a headrest. In this way, an opportunity to relax or work is provided in a simple manner.

The headrest or the vehicle seat can also have an indicator device on a side of the headrest facing away from the head position. If the user is in a "privacy mode" while listening to music or relaxing, the indicator device can be activated at the same time. Accordingly, the light lights up on the side facing away from the head, for example the back of the headrest or the vehicle seat. This light is an indication that the user does not want to be disturbed or that they may have difficulty hearing the passenger. In this way, it is possible to signal to a passenger that the occupant in question does not want to be disturbed.

Since the headrest has a device for noise suppression, it may happen that the user of the headrest does not notice when a passenger speaks to him. Because the headrest or vehicle seat also has an indicator device, this can be visually signaled to the passenger in a simple and intuitive manner.

For example, the indicator device can have a light source. The indicator device can be designed in such a way that the light source can be seen from outside. Accordingly, the indicator device can be designed as a marker light.

According to further embodiments, the indicator device can also have a light source and a diffuser. It can therefore be designed as ambient light. For example, changing the light color can indicate that a specific listening mode has been set.

According to further embodiments, the indicator device can also have a luminous stone. This can be positioned, for example, under the headrest or in a recess of the vehicle seat. The luminous stone can comprise a transparent plastic into which, for example, an individualized inscription can be engraved or lasered. This inscription is illuminated by the light source and thus emphasizes the message in an improved manner.

The device for noise suppression can effectuate the noise suppression by active or passive measures. For example, with passive noise suppression, a surface of the headrest that faces toward the head can be structured accordingly or covered with a corresponding material so that certain noises are suppressed. In the case of a device for active noise suppression, the device for noise suppression has additional loudspeakers which generate a so-called anti-noise or counter-noise. This is artificially generated by the additional loudspeakers in order to eliminate or attenuate the noises to be suppressed by means of destructive interference. For this purpose, for example, a counter signal can be generated that corresponds to that of the disturbing sound, but has an opposite polarity.

For example, the device for noise suppression can be designed to suppress specific frequencies. Accordingly, for example, anti-noise signals are generated having corresponding frequencies that eliminate these specific frequencies via destructive interference. In this way it is possible to block out certain vehicle noises. Furthermore, ambient noise and the voices of passengers can be selectively switched off. According to further embodiments, it is possible for the voices of other vehicle occupants or ambient noise to be blocked out hereby, but, for example, signal noises from other automobiles or sirens are not suppressed. Using the device, which is suitable for suppressing specific frequencies, the level of safety when driving can be increased.

The device for noise suppression can also have speakers for emitting desired signals. For example, the user can listen to certain music programs or radio programs or make phone calls while ambient noise is blocked out.

BRIEF DESCRIPTION OF THE FIGURES

Further advantages and details of the invention result from the following description of embodiments with reference to the figures. In the figures:

FIG. 1 shows an example of a vehicle seat having a headrest according to embodiments.

FIG. 2A shows a rear view of a vehicle seat according to the embodiment.

FIG. 2B shows a front view of a vehicle seat according to embodiments.

DETAILED DESCRIPTION

Figure 2C:
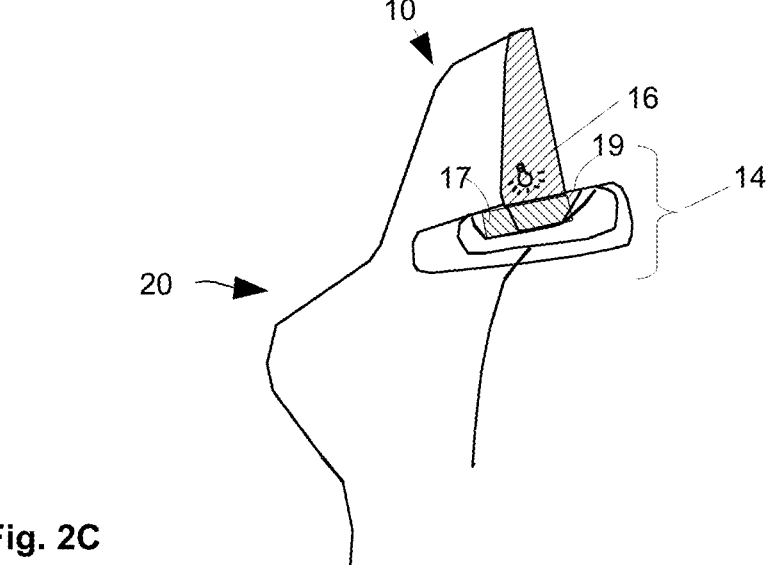
FIG. 2C shows a partial cross-sectional view of a vehicle seat according to embodiments.

In the following detailed description, reference is made to the accompanying drawings, which form a part of the disclosure and in which specific exemplary embodiments are shown for illustrative purposes. In this context, a directional terminology such as "top", "bottom", "front", "back", "over", "on", "in front", "behind", "forward", "rear", etc., is related to the orientation of the figures just described. Because the components of the exemplary embodiments may be positioned in different orientations, the directional terminology is for explanation only and is not limiting in any way.

The description of the exemplary embodiments is not restrictive, since other exemplary embodiments also exist and structural or logical changes can be made without departing from the scope defined by the claims. In particular, elements of exemplary embodiments described below can be combined with elements of others of the exemplary embodiments described, unless the context states otherwise.

FIG. 1 shows a vehicle seat 20 having a headrest 10. The vehicle seat 20 can be, for example, a vehicle seat for a motor vehicle. According to further embodiments, however, the vehicle seat can also be used in other vehicles, for example, buses, airplanes, trains, etc. or also in other areas, for example in the home, in waiting areas, and others. The vehicle seat 20 has a headrest 10. The headrest 10 is designed to at least partially surround a head of a user. The headrest also has a device 12 for noise suppression, which is arranged on a side of the headrest 1 facing toward a head position. More specifically, the device 12 for noise suppression is arranged on the inside of the headrest 10. According to embodiments, an indicator device 14 can be provided on a side of the headrest 10 facing away from the head position. The indicator device 14 can, as shown in FIG. 1, enclose part of the outside of the headrest. In this way, even people who are not sitting directly behind the user can recognize that the user is currently using the noise suppression function. For example, the indicator device 14 can be activated at the same time as the noise suppression is activated.

As shown in FIG. 1, the indicator device can be designed in the form of a strip. According to further embodiments, however, it can also be designed in any other way that enables visual recognizability. According to further embodiments, the indicator device does not necessarily have to be attached to the headrest itself. According to further embodiments, it can be attached at an arbitrary point on the vehicle seat 20.

For example, the device 12 for noise suppression can additionally have loudspeakers 13 for emitting desired signals, for example music signals. For example, the device for noise suppression can be designed to suppress specific frequencies.

FIG. 2A shows a schematic view of a vehicle seat 20, into which a headrest 10 is integrated. The side of the vehicle seat 20 facing away from the head position is shown in FIG. 2A. The indicator device 14 can, for example, have a light source 16, which can be integrated, for example, into the vehicle seat 20 or into the headrest 10. The light source can be arranged above a recess 15 within the vehicle seat 20 or the headrest 10 and, for example, illuminate a luminous stone 17. The luminous stone 17 can comprise a transparent plastic into which an individualized inscription 19 can be engraved or lasered. This allows a message, such as "sleep mode", to be emphasized well.

FIG. 2B shows a view of a front side, i.e., the side facing toward the user, of the vehicle seat 20 having integrated headrest 10. Here again the devices 12 for noise suppression are recognizable, which are arranged on a side of the headrest 10 facing toward a head position.

FIG. 2C shows a partial cross-sectional view of the vehicle seat 20. It can also be seen here that the light source is arranged in a recess within the vehicle seat, while further components of the indicator device are arranged below the light source 16.

Figure 3:
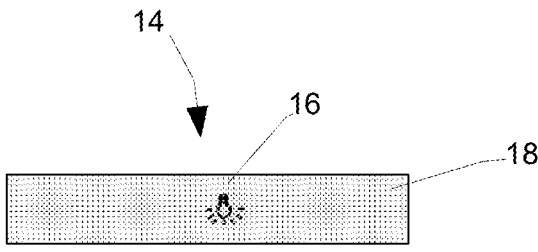
FIG. 3 shows an example of an indicator device according to embodiments.

FIG. 3 shows a schematic view of an indicator device 14, in which the indicator device has a light source 16 and a diffuser 18. In this way, ambient light can be implemented.

The invention described relates, on the one hand, to a headrest 10, which has the device for noise suppression as a separate element and, if necessary, other components. It is self-evident that the headrest 10 can also be integrated into a vehicle seat 20 or attached thereto. Accordingly, the elements described can also be components of a vehicle seat, as shown, for example, in FIGS. 2A to 2C.

As described above, the headrest described can be used to set a user in the so-called "privacy mode", due to which noises of the passengers are less noticeable to the user. At the same time, a desired signal, for example a piece of music or a radio program, can be emitted so that the user perceives it more clearly. Because, according to embodiments, the headrest has an indicator device, a passenger can be given an indication that the user does not wish to be disturbed. Furthermore, the passenger can be signaled that the user has difficulty hearing the passengers sitting behind him. This implementation can more strongly increase the level safety of the user and also the passengers.

Although specific embodiments have been illustrated and described herein, those skilled in the art will recognize that the specific embodiments shown and described may be replaced by a variety of alternative and/or equivalent embodiments without departing from the scope of protection of the invention. The application is intended to cover any adaptations or variations of the specific embodiments discussed herein. Therefore, the invention is restricted only by the claims and their equivalents.

The invention claimed is:

1. A headrest, which is designed to at least partially surround a head, comprising
   a device for noise suppression, which is arranged on a side of the headrest facing toward a head position; and
   an indicator device on a side of the headrest facing away from the head position;
   wherein the indicator device comprises a light source;
   wherein the device for noise suppression contains loudspeakers for emitting desired signals;
   wherein the headrest is configurable by a user to enter or exit a privacy mode such that when the privacy mode is active, the device for noise suppression suppresses at least one frequency, the light source of the indicator device emits a light, and the loudspeakers emit a sound.

2. The headrest according to claim 1, wherein the indicator device furthermore comprises a diffuser.

3. The headrest according to claim 1, wherein the indicator device furthermore comprises a transparent display element having an inscription.

4. The headrest according to claim 1, wherein the device for noise suppression is designed to suppress specific frequencies.

5. A vehicle seat comprising the headrest according to claim 1.

6. The vehicle seat according to claim 5, furthermore comprising an indicator device on a side of the vehicle seat facing away from the head position.

7. The vehicle seat according to claim 6, wherein the indicator device comprises a light source.

8. The vehicle seat according to claim 7, wherein the indicator device furthermore comprises a diffuser.

9. The vehicle seat according to claim 7, wherein the indicator device furthermore comprises a transparent display element having an inscription.

10. The headrest according to claim 1, wherein the device for noise suppression is designed to suppress specific frequencies.

11. The headrest according to claim 2, wherein the device for noise suppression is designed to suppress specific frequencies.

12. The headrest according to claim 2, wherein the device for noise suppression is designed to suppress specific frequencies.

13. The headrest according to claim 1, wherein the device for noise suppression contains loudspeakers for emitting desired signals.

14. The headrest according to claim 2, wherein the device for noise suppression contains loudspeakers for emitting desired signals.

* * * * *